United States Patent Office 3,605,872
Patented Sept. 20, 1971

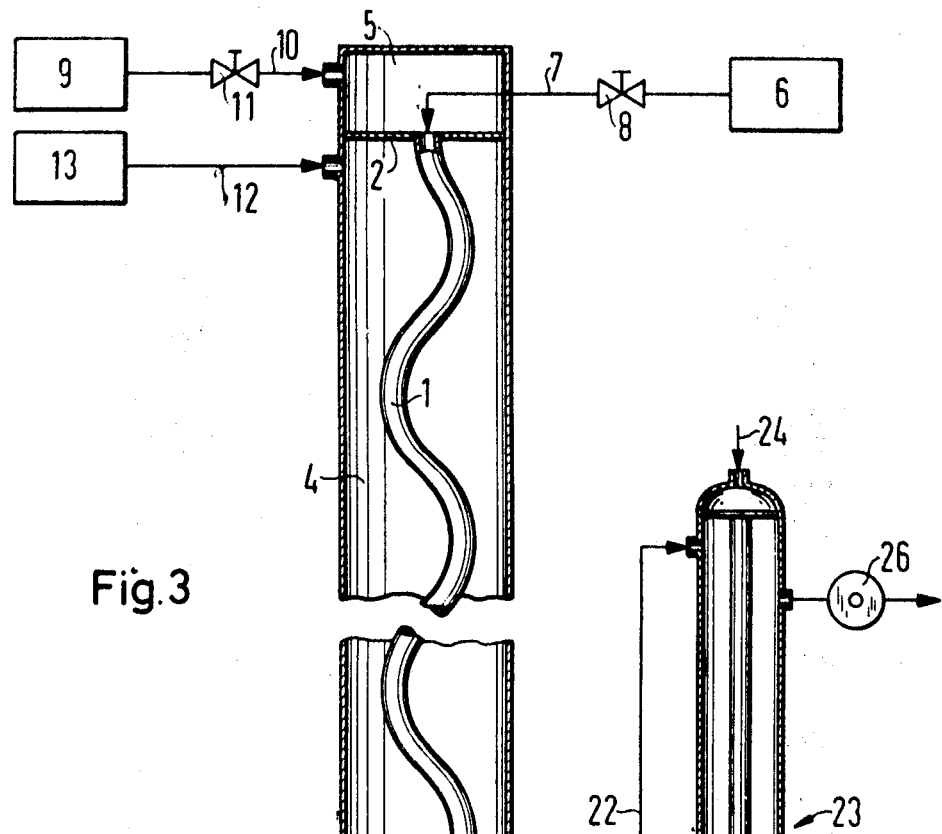
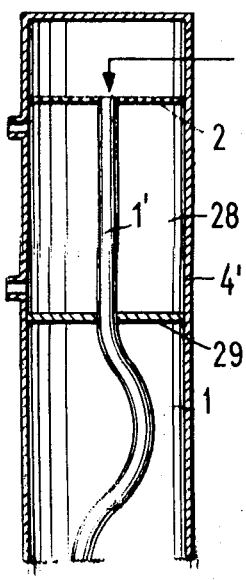
Fig. 3
Fig. 5

3,605,872
METHOD OF CAUSING A LIQUID TO FLOW IN A STREAM OF ANNULAR CROSS SECTION
Jacques Brault, Neuilly-sur-Seine, France, assignor to Wiegand Apparatebau G.m.b.H., Karlsruhe, Germany
Filed Aug. 11, 1969, Ser. No. 849,620
Claims priority, application France, Aug. 15, 1968, 12,295
Int. Cl. F28d; B01d 1/22
U.S. Cl. 165—1
16 Claims

ABSTRACT OF THE DISCLOSURE

When a liquid and a gas are passed continuously through a helical heat exchanger conduit spiraling about a vertically extending axis, the liquid is forced against the wall of the conduit and the gas occupies the center of the tube if the flow rates of the liquid and gas are controlled to permit the liquid to be discharged from the conduit over the entire circumference of the exit orifice of the conduit. High heat transfer coefficients are obtained thereby between the liquid and the conduit wall.

---

Figure 1:
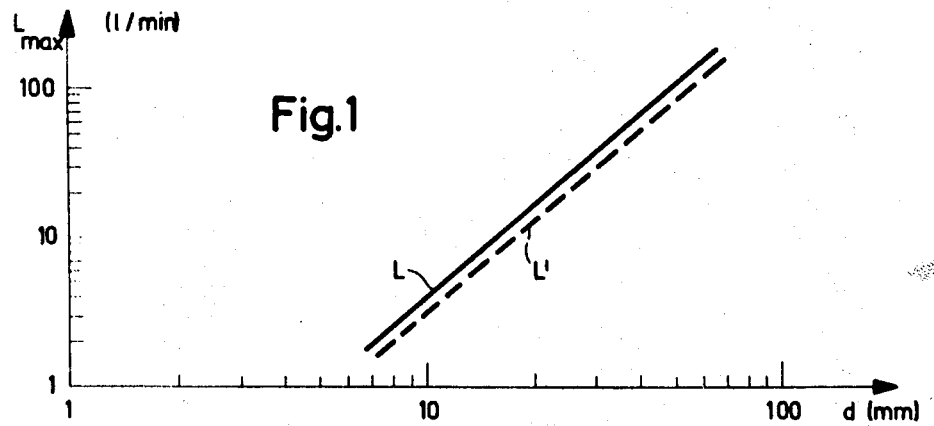

This invention relates to the interaction of liquids with their environment, and particularly to a method of causing a liquid to flow in a stream of annular cross section.

The invention will be described hereinafter mainly in its application to the partial evaporation of a liquid, but it will readily become apparent that the invention is not limited to this specific application. The liquid to be evaporated is in contact with a gaseous phase, and the rate of evaporation is controlled to a significant extent by conditions at the interface of the gas and liquid. Another important factor controlling the rate of evaporation is the area of contact between the liquid and a solid source of thermal energy.

A high rate of evaporation is achieved if a rapidly moving thin film of liquid covers a solid, heat-exchanging wall from which thermal energy is supplied to the liquid. In a tubular evaporator in which the liquid to be evaporated is confined within externally heated tubes, a very high rate of heat transfer is achieved if the heat transmitting walls of the tube are covered by a stream of the liquid which is uniformly annular in cross section, and envelops a gas or vapor space in the center of the tube.

Known devices for causing a liquid to flow in an annular stream are not fully effective unless they are rather complex and costly to build. A liquid flowing downward along a tube wall tends to form rings of increased thickness which extend transversely to the direction of liquid flow and travel downward by annular waves in the liquid film, their amplitude increasing as they move. The annular accumulations of liquid cause the concentrated liquid to be discharged from a descending tube at a cyclically varying rate. In extreme cases, the discharge may be intermittent.

The phenomena described above are characteristic for many falling film evaporators when operated under all but most favorable conditions. They reduce the heat transfer coefficient in those areas of the tube wall in which the liquid film is at its smallest thickness, sometimes no more than the quiescent boundary layer being present. The non-uniform film is partly over-heated which may cause damage to dissolved heat-sensitive materials and the formation of solid crusts on portions of the tube wall. Because the evaporation rate is high in some portions of the liquid film, solutions of solid material may be evaporated until super-saturated, and insoluble material may be formed. Further deterioration of the solute may be due to unequal dwell times in the evaporator tube, the material in the annular accumulations traveling much faster through the tube than the thin film portion between the rings.

The object of the invention is the provision of a method of causing a liquid to flow in a stream of at least substantially uniform, annular cross section so that the liquid may be partly evaporated under controlled and constant conditions, and the aforedescribed shortcomings of known evaporators may be avoided.

It has now been observed that a liquid forced to flow in a path of continuously varying direction tends to form a film of more uniform thickness than an otherwise similar liquid flowing in a straight path. Based on this observation, it has been found that a liquid can be caused to flow in a stream of annular and uniform cross section when the liquid is fed to one terminal portion of a conduit spiraling about a vertically extending central axis and is continuously withdrawn from the other terminal portion of the conduit, while a continuous stream of a gas is passed through the conduit at a rate sufficient to force the liquid against the inner wall of the conduit, and smaller than the rate at which the stream of gas would prevent the liquid from covering the entire circumference of the conduit in the other terminal portion of the conduit from which the liquid is withdrawn.

Tests have shown that the flow rate of the liquid should be limited to a maximum value defined by the relationship $$L_{max} = 0.046 d^2 - 0.16 d + 0.8$$

wherein $L_{max}$ is the permissible maximum flow rate in liters of liquid per minute and $d$ is the hydraulic diameter of the conduit in millimeters. The term "hydraulic diameter" as employed in this specification and the appended claims is defined as the ratio between the internal cross section of the conduit and its circumference as measured along the inner wall in the cross section.

In additional tests, it has been determined that the gas stream meeting the above requirements must have a minimum flow rate $V_{min}$ which is related to the viscosity of the simultaneously present liquid, the hydraulic diameter $d$ of the conduit, and to the prevailing gas pressure $p$ by the relationship $$V_{min} = K(d-6)\sqrt{p}$$

wherein $V_{min}$ is expressed in cubic meters per minute, reduced to standard conditions of temperature and pressure (0° C. and 760 mm. Hg), $d$ is expressed in millimeters, and $p$ in bars. K is a constant characteristic of the liquid flowing through the conduit. It has a value of 0.05 for a viscosity of one centipoise, a value of 0.02 for a viscosity of 250 centipoise, and other values can be determined with adequate accuracy by interpolation and extrapolation from a straight line drawn on a linear graph of K as a function of viscosity (cp.) through the two points defined by the above numerical values.

Figure 2:
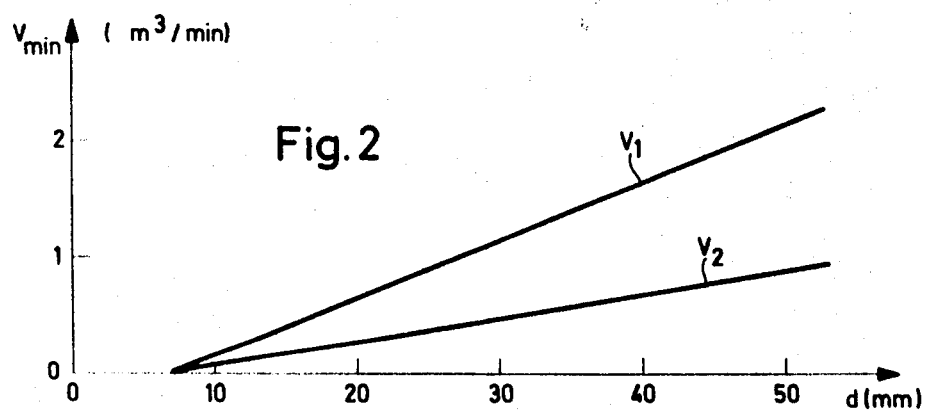
Figure 4:
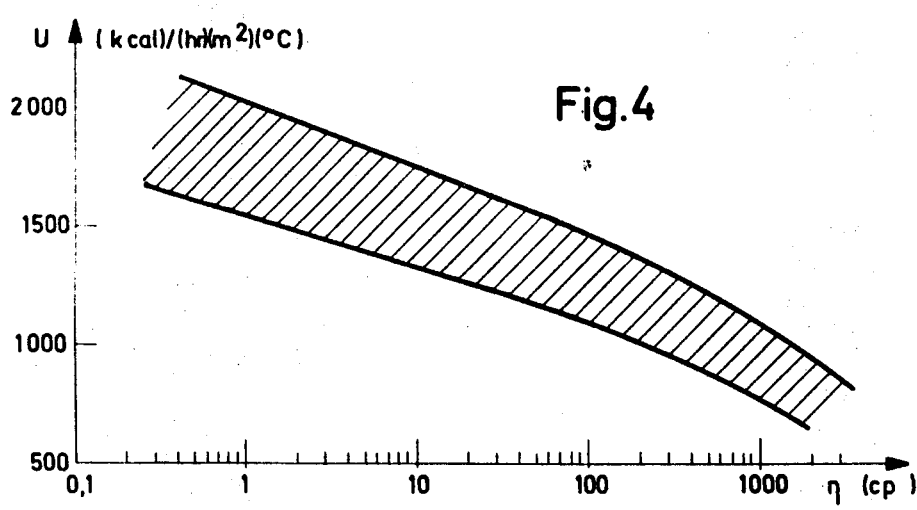

Other features of the invention will become evident from the following description of specific embodiments when considered in connection with the appended drawing in which:

FIG. 1 graphically represents the afore-mentioned relationship between the hydraulic diameter $d$ of the conduit and the permissible liquid flow rate $L_{max}$, the graph being on a logarithmic scale;

FIG. 2 graphically illustrates the afore-mentioned relationship between the hydraulic diameter $d$ of the conduit and the necessary minimum flow rate $V_{min}$ of the gas, the ordinates of the graph being in linear units;

FIG. 3 shows apparatus for performing the method of the invention in elevation and partly in section;

FIG. 4 graphically illustrates the overall heat transfer coefficients U that have been achieved in apparatus of the type shown in FIG. 3 with liquids of various viscosities; and FIG. 5 shows a modification of the apparatus of FIG. 3 in fragmentary elevational section.

Referring initially to FIG. 3, there is seen an experimental evaporator of the type used for determining the relationships illustrated in FIGS. 1, 2 and 4. The heat transfer conduit is a cylindrical tube of practically uniform cross section bent into a cylindrical helix. The terminal portions of the conduit 1 are sealed into two tube sheets 2, 3 near the top and bottom of an upright tubular shell 4 coaxial with the helix of the tube 1.

The tube sheet 2 bounds a feeding chamber in the top of the shell 4 which is supplied with the liquid to be evaporated from a tank 6 through a line 7 equipped with a control valve 8. Saturated steam is simultaneously supplied to the chamber 5 from a boiler 9 through a line 10 controlled by a valve 11. The central portion of the shell 4 between the tube sheets 2, 3 provides a heating jacket for the helical conduit 1 and is fed heating steam from a boiler 13 through a line 12 near the sheet 2. Condensate is withdrawn from the bottom of the heating jacket through a condensate line 14.

The tube sheet 3 bounds a separator chamber 15 in the bottom of the shell 4. A horizontal partition 16 equipped with a vertical passage 17 divides the chamber 15 into two compartments 18, 19. The liquid concentrate and steam discharged from the bottom end of the conduit 1 are separated in the chamber 15, and the liquid is withdrawn through a drain line 20 and a pump 21.

The steam is led by pipe 22 to a tubular surface condenser 23. Cooling water is fed to a central heat exchanger tube of the condenser by a feed line 24 and is discharged through a line 25. A suitable low pressure is maintained in the condenser by an air pump 26, and the condensate is discharged through a rain line 27 equipped with a non-illustrated pump.

In the experimental evaporator, the conduit 1 was shaped from a stainless steel pipe having an outer diameter of 42 mm. and an inner diameter of 36 mm. It was internally coated with a layer of liquid-repellent polytetrafluoroethylene 0.03 mm. thick. The radius of the helix was equal to the internal diameter of the pipe, that is, 36 mm. The spacing of axially adjacent turns of the helix was 600 mm. so that the ratio between that spacing and the helix diameter was approximately 8.5. The length of the initially straight tube was 6.8 meters, and the height of the helix as measured between the tube sheets 2, 3 was 6.44 meters.

The conventional temperature, flow and pressure gages with which the apparatus was fully equipped have been omitted from the drawing together with the auxiliary heat exchangers in the lines 7 and 20 which heated the dilute liquid to the boiling point and cooled the concentrate.

Similar apparatus, entirely constructed of glass, was employed for determining the conditions under which the readily observed liquid stream in the heated helical conduit assumes the desired annular cross section, as illustrated in FIGS. 1 and 2.

At maximum flow rates represented by the straight line L in the logarithmic graph of FIG. 1 as a function of the conduit diameter $d$, the liquid may be made to flow through the conduit 1 under steady state conditions by controlling the gas stream. While the cross section of the annular liquid stream may not be entirely uniform over the length of the tube 1, such local accumulations of liquid as may form are stationary, and every portion of the liquid fed to the upper terminal portion of the tube passes through the tube under identical conditions. At the slightly lower flow rates represented by the line L' in FIG. 1, the stream is of uniform radial thickness.

The volumetric flow rate of the gas in the tube 1 may be controlled by visual observation in a transparent evaporator. At a readily observed minimum flow rate of the gas, the liquid stream assumes the desired annular cross section. If the gas rate becomes too high, the liquid film is distorted and broken up in the lower terminal portion of the tube 1, and the gas stream flowing at an excessive rate prevents the liquid from covering the entire circumference of the conduit in the lower terminal portion of the tube 1 at the tube sheet 3.

The minimum flow rate $V_{min}$ of the gas stream which is sufficient to force the flowing liquid against the inner wall of the conduit 1 has been found to be a function of the hydraulic diameter of the conduit, the prevailing gas pressure, and the viscosity of the liquid as defined above. It will be appreciated that the conditions controlling the flow rate $V_{min}$ may vary, and usually do vary along the helical, longitudinal axis of the path in which the liquid and gas flow, and that at least the minimum flow rate must be maintained over the entire length of the tube 1 for optimum results.

The relationship between the viscosity $\eta$ of the flowing liquid and the value of the constant K has not been specifically illustrated in the drawing. It has been found experimentally that K is practically a linear function of the viscosity $\eta$ in centipoise, and can therefore be read from a straight line on a linear graph of $K$ v. $\eta$ drawn through the points $\eta=1$ cp., $K=0.05$, and $\eta=250$ cp., $K=0.02$. The relationship has been found to be adequately valid not only at viscosities between 1 and 250 cp., but also at all other viscosity values under which tests were performed as partly shown in FIG. 4.

FIG. 2 shows the relationship between the minimum value of gas flow in cubic meters per minute (S.T.P.) at different hydraulic diameters of the tube 1 at a gas pressure of 1 bar for liquids having viscosities of 1 cp. ($V_1$) and 250 cp. ($V_2$).

The values of L and L', as shown in FIG. 1, were found to be independent of the viscosity of the liquid and the specific configuration of the heat exchanging tube, in which the liquid flows, as long as the tube spirals about a vertically extending axis. It need not have a circular cross section nor is it necessary that its longitudinal axis define the cylindrical helix shown in FIG. 3, nor is a uniform inclination of the several turns of the helix essential. The turns may be spaced irregularly, and their diameters may vary in the direction of the central axis of the helix.

The graphs of FIGS. 1 and 2 were established in numerous experiments using air as a gaseous phase and confirmed by tests with other gases in tubes having internal diameters of up to 50 millimeters and various shapes. In view of the convenience of bending tubes into cylindrical helices of uniform pitch, an extensive series of tests was run on such helical conduits in which the helix diameters, as measured on the longitudinal helical axis of the conduit, varied between 5 and 140 mm., the spacing of consecutive turns between 500 and 1500 mm., and the ratio of helix diameter to turn spacing between 1:1.75 and 1:150. No significant effects on the parameters described above were observed. A ratio of 1:5 to 1:15 is preferred. The helix diameter should preferably be 0.25–8 times the conduit diameter, and a ratio of 0.8:1 to 2:1 has been found most desirable.

While the exact physical mechanism on which this invention is based is not yet entirely understood, it is believed that centrifugal forces generated by fluid flow in a spiraling path are at the root of the method of this invention. It was therefore surprising that the desirable results could be achieved in helical tubes whose longitudinal axes defined helices of relatively small diameter and whose consecutive turns were spaced widely apart so as to make the flow path quite steep. This fact permits many heat exchanger tubes of the invention to be installed between common tube sheets in shells of small diameter. It is also much easier mechanically to clean evaporator tubes whose axes deviate only to a small extent from a straight line, as in a helix whose radius is smaller than the tube diameter.

For economic reasons, it is most desirable to operate the evaporator of the invention at gas flow rates as close as possible to the minimum rates evident from FIG. 2 and otherwise calculated from the relationships indicated above. It is not necessary, however, to measure the various factors $K$, $d$ and $p$, nor is it necessary to observe the liquid flow in the heat exchanger tube 1. As has been amply confirmed by observations made on transparent devices of the invention. The conditions of the liquid stream discharged from the lower end of the tube 1 are fully indicative of the flow conditions in the tube. When an annular stream extending over the entire circumference of the lower tube orifice is discharged, the values of gas and liquid flow in the tube are within the limits numerically expressed by the above relationships. Limitations relevant to this statement will be discussed below.

When the method of the invention is used in the partial evaporation of a liquid, such as a solution of a solid material in a solvent, the flow rate of the liquid decreases along the heat exchanger tube, and the flow rate of the gaseous phase increases correspondingly as liquid is converted to vapor. These facts have to be considered in operating devices of the type shown in FIG. 3. A portion of the heat exchanger tube may become inoperative if the gas stream entering the tube 1 at its upper orifice does not have the required minimum volume. Heat exchange at the high coefficient values characteristic of evaporators of the invention would still take place in the lower portion of the tube as long as the discharged liquid has the afore-described annular cross section.

It is therefore preferred to feed a gas together with the liquid to the same terminal portion of the helical heat exchanging conduit, and not to rely solely on the vapor formed by partial evaporation for forcing the residual liquid against the inner wall of the conduit. The gas employed will normally be chemically inert to the liquid if evaporation only is desired to be achieved. Air and steam have been used successfully as inert gaseous media in evaporation tests. Steam is preferred for the evaporation of aqueous liquids, and may be produced at least in part by evaporation of the liquid in or outside the heat exchanging conduit, as by heating the liquid in the line 7 to a temperature at least equal to its boiling point under the pressure conditions prevailing in the feed chamber 5 and the conduit 1. If steam is also fed to the chamber 5, it is necessary to preheat the liquid to prevent partial condensation of the steam.

A modification of the apparatus of FIG. 3 which makes it unnecessary to supply steam to the feed chamber 5 is shown in FIG. 5. The length of the shell 4' between the tube sheets 2, 3 is such that it can accommodate an additional length of the tubing 1' which is straight from the tube sheet 2 down to the first turn of the helix 1. The heating jacket 28 in the axial shell section accommodating the straight tube portion 1' is separated by a partition 29 from the remainder of the shell section and supplied with steam hot enough to heat the downwardly flowing liquid beyond its boiling point at the relatively low pressure prevailing in the helical tube turns. The straight tube portion 1' thus operates in the manner of the heating tube in a conventional falling film evaporator.

For highest overall heat transfer in the helical tube portion, enough steam must be produced in the straight section to meet the requirements of gas flow indicated in FIG. 2. Under typical conditions, the length of the straight tube section may be between $\frac{1}{4}$ and $\frac{1}{12}$ of the total tube length, as measured along the partly helical, longitudinal axis, and is readily calculated for each set of operating conditions. As long as the straight tube section extends over only a small fraction of the total tube length, the formation of annular accumulations of liquid traveling in waves through the helical evaporator tube is safely avoided.

The dwell times of the several portions of a liquid flowing through an evaporator of the invention may still not be entirely uniform because of the formation of a slowly moving liquid boundary layer at the inner wall surface of the heat exchanger conduit. It has been found that the formation of such a boundary layer can be avoided by giving the inner wall of the heat exchanger tube a surface not capable of being wetted by the liquid, as by coating the inner wall of the tube 1 with a thin layer of polytetrafluoroethylene, as described with reference to FIG. 3. The unfavorable effects of such a plastic layer on the coefficient of heat transfer which have been observed in straight heat exchanger tubes were not found in the tubes of the invention whose direction changes continuously, thereby holding the liquid to the tube walls by centrifugal forces.

FIG. 4 shows the results achieved with the afore-described apparatus shown in FIG. 3 when partly evaporating aqueous solutions of glucose having initial concentrations of 350 to 620 grams per 100 ml., final concentrations of 620 to 830 grams per 100 ml., and viscosities varying between 20 and 800 cp. The shaded area in FIG. 4 covers the values of overall heat transfer coefficients U in (kcal.)/(hour) (m.$^2$) (° C.) determined at the various values of viscosity $\eta$ in centipoise in a multiplicity of tests. These results indicate that the method of the invention permits solutions of very high viscosity to be concentrated by evaporation with overall coefficients of heat transfer which favorably compare with those achieved in thin layer evaporators equipped with mechanical agitators. Yet, the mehod of the invention does not require agitators or other movable elements.

The method of the invention is used to advantage whenever a thin film of liquid is to be kept in contact with a solid wall and/or a gas. The range of applications thus includes the carrying out of chemical reactions.

The apparatus shown in FIG. 3 may be used for absorbing a gas in a liquid under strongly exothermic conditions. Reactions of this type include the sulfonation of olefins with sulfur trioxide, the nitration and halogenation of benzene and other aromatic compounds, and the direct halogenation of alkanes.

The method of the invention is further applicable to the polymerization of undiluted organic monomers in the liquid state, and the benefits of the invention are particularly great under conditions in which the polymerization reaction is strongly exothermic so that it cannot be performed in bulk on an industrially practical scale and must be carried out in a solution or an emulsion to permit adequate temperature control. The polymers produced in streams of the corresponding liquid monomers according to the method of this invention are distinguished by unusually narrow ranges of molecular weights because each portion of the liquid material is subjected to the same temperature changes during the same dwelling periods.

At least some of the advantages of the invention can be achieved by feeding the liquid and gas to apparatus such as that shown in FIG. 3 in a manner different from that illustrated. Thus the liquid may be fed from the top while the gas is passed through the tube 1 counter-current from the bottom up. Liquid flow against gravity is not normally desirable, but it is not entirely impossible to feed the liquid to the bottom end of the the tube 1 while the gas is being fed to either the top or bottom ends. The illustrated arrangement is preferred for obvious reasons.

The effect of gravity on the liquid stream is reduced when the liquid path assumes a shape approaching that of a conical spiral at unchanged overall length, and gravity is no longer helpful in driving the liquid through the tube when the axial length of the conical helix is reduced to a value approaching zero. Yet, heat transfer conduits having the shape of flat horizontal spirals may be employed in practicing this invention with some success. The manner in which heat is transferred from the inner wall of the conduit is not particularly relevant. Successful tests have been performed with conduits cut into a solid block of metal which was heated externally, and other heat exchange arrangements will readily suggest themselves to those skilled in the art.

It should, therefore, be understood that the foregoing disclosure relates only to preferred embodiments of the invention, and that numerous modifications or alterations may be made therein without departing from the spirit and scope of the invention.

What is claimed is:

1. A method of causing a liquid to flow in a stream of annular cross section which comprises:
   (a) continuously feeding said liquid to one of the two terminal portions of a conduit spiraling about a vertically extending central axis;
   (b) continuously withdrawing said liquid from the other one of said terminal portions; and
   (c) simultaneously passing a continuous stream of a gas through said conduit at a rate sufficient to force said liquid against the inner wall of said conduit and smaller than the rate at which said stream of gas would prevent the liquid from covering the entire circumference of the conduit in said other terminal portion of the same.

2. A method as set forth in claim 1, wherein the liquid is fed to said conduit at a rate not greater than the maximum rate $L_{max}$, in liters per minute, which is defined by the relationship $$L_{max} = 0.046d^2 - 0.16d + 0.8$$

in said relationship, $d$ being the hydraulic diameter of said conduit in millimeters and at least 6 millimeters.

3. A method according to claim 2, wherein said gas is passed through said conduit at a rate not smaller than the minimum flow rate $V_{min}$ in cubic meters per minute, as reduced to conditions of standard temperature and pressure, said minimum flow rate being defined by the relationship $$V_{min} = K(d-6)\sqrt{p}$$

wherein K is a constant representative of the viscosity of said liquid, having a value of 0.05 when said viscosity is one centipoise, a value of 0.02 when said viscosity is 250 centipoise, and having values obtained by linear interpolation and linear extrapolation from said values of 0.05 and 0.02 at viscosities other than one centipoise and 250 centipoise, $d$ being the hydraulic diameter of said conduit in millimeters and more than 6 millimeters, and $p$ being the pressure of said gas in said conduit in bars.

4. A method according to claim 3, wherein said terminal portions are vertically spaced, and said liquid and said gas are fed to the upper terminal portion of said conduit.

5. A method according to claim 3, wherein said liquid, while flowing in said conduit is held under conditions of evaporation, the vapors formed by said evaporation constituting a portion of said gas.

6. A method according to claim 3, wherein said conditions of evaporation include a temperature substantially equal to the boiling point of said liquid under the pressure prevailing in said conduit.

7. A method according to claim 3, wherein said liquid and said gas flow in said conduit in a cylindrically helical path having a helical longitudinal axis, the diameter of the helix defined by said longitudinal axis being 0.25 to 8 times the diameter of said conduit.

8. A method according to claim 7, wherein the diameter of the helix defined by said longitudinal axis is 0.8 to 2 times the diameter of said conduit.

9. A method according to claim 7, wherein the helix defined by said longitudinal axis consists of a plurality of spaced consecutive turns, the spacing of each pair of consecutive turns in the direction of said central axis being between 1.75 and 150 times said diameter of said helix.

10. A method according to claim 9, wherein said spacing is between 5 and 15 times said diameter of said helix.

11. A method according to claim 1, wherein said wall has a surface not capable of being wetted by said liquid.

12. Heat transfer apparatus comprising, in combination:
   (a) a tubular, elongated conduit of heat conductive material having a longitudinal axis extending substantially in a cylindrical helix,
      (1) the diameter of said helix being 0.25 to 8 times the diameter of said conduit,
      (2) the spacing of consecutive turns of said helix being between 1.75 and 150 times the diameter of said helix;
   (b) feeding means for feeding a liquid and a gas to said conduit; and
   (c) a source of thermal energy in contact with said conduit for transfer of heat through said material to said liquid and said gas, and for thereby heating said liquid and said gas to an elevated temperature.

13. Apparatus as set forth in claim 12, wherein the diameter of said helix is between 0.8 and 2 times the diameter of said conduit.

14. Apparatus as set forth in claim 13, wherein said spacing is between 5 and 15 times said diameter of the helix.

15. Apparatus as set forth in claim 12, wherein said conduit has an inner wall having a liquid-repellent surface.

16. Apparatus as set forth in claim 12, said feeding means including a tube extending in the direction of the axis of said helix and communicating with said conduit for sequential flow of said liquid through said tube and said conduit, said tube being of heat conductive material, and heating means for heating said tube above the boiling point of said liquid and to a temperature higher than said elevated temperature, the axial length of said tube being ¼ to 1/12 the combined length of said tube and of said conduit.

References Cited
UNITED STATES PATENTS

| | | | |
|---|---|---|---|
| 2,545,028 | 3/1951 | Haldeman | 261—112X |
| 2,932,490 | 4/1960 | Olander | 165—163X |
| 3,050,786 | 8/1962 | St. John et al. | 165—133 |
| 3,482,947 | 12/1969 | Jacobsen et al. | 261—112 |

WILLIAM F. O'DEA, Primary Examiner

P. D. FERGUSON, Assistant Examiner

U.S. Cl. X.R.

137—13; 159—13A, 16S; 165—133, 163; 261—112